April 15, 1930. J. H. SUSSMAN 1,755,036
CAMERA ATTACHMENT FOR MAKING ARTIFICIAL REFLECTIONS Filed March 28, 1928

WITNESSES
Jos. L. Lamia
J. W. Foster

INVENTOR
Jacob H. Sussman
BY
ATTORNEY

Patented Apr. 15, 1930

1,755,036

UNITED STATES PATENT OFFICE

JACOB H. SUSSMAN, OF BROOKLYN, NEW YORK, ASSIGNOR OF ONE-HALF TO EDWARD J. HERBERT, OF NEW YORK, N. Y.

CAMERA ATTACHMENT FOR MAKING ARTIFICIAL REFLECTIONS

Application filed March 28, 1928. Serial No. 265,421.

This invention relates to a camera attachment for making artificial reflections, an object of the invention being to provide a reflecting surface located at the end of the lens barrel and on which the object to be photographed is reflected so that the plate or film will receive the impression of the object and also of the reflection, giving the impression of still water adjacent the object and in which the object is reflected.

A further object is to provide a device of this character which can be manufactured and sold at a reasonably low price, which may be used in connection with any type of camera, and which will most efficiently perform the functions for which it is intended.

With these and other objects in view, the invention consists in certain novel features of construction and combinations and arrangements of parts, which will be more fully hereinafter described and pointed out in the claims.

In the accompanying drawings—

Figure 1:
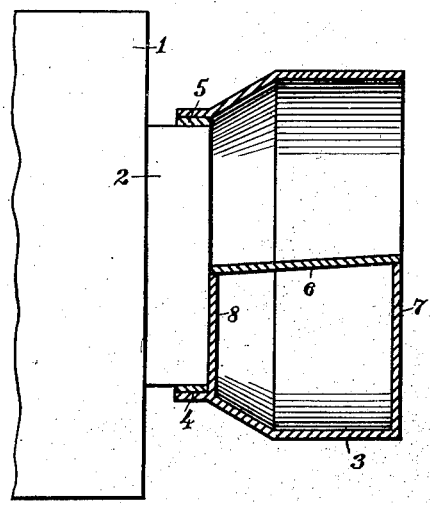
Figure 1 is a view showing a portion of a reflex camera in elevation and showing my improved attachment in vertical section, the view being taken on the section line 1—1 of Figure 2.
Figure 2:
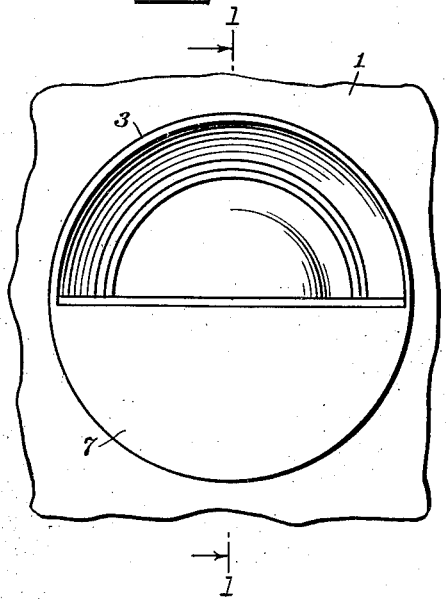
Figure 2 is a view in elevation at right angles to Figure 1.
Figure 3:
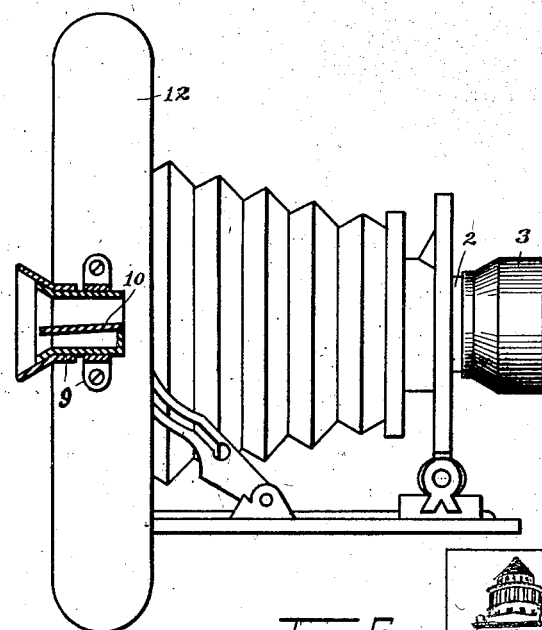
Figure 3 is a view, mainly in elevation but partly in section, showing my attachment in connection with an ordinary camera, and illustrating in section a finder attachment which simulates the reflector attachment.
Figure 4:
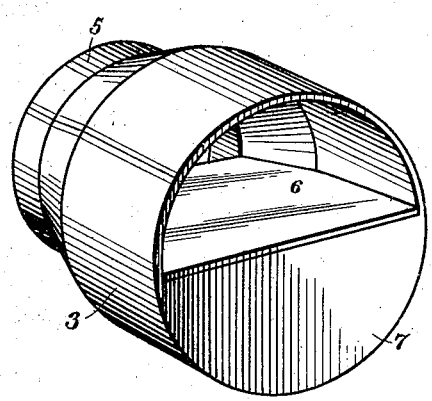
Figure 4 is a perspective view of my improved attachment.

Referring more particularly to Figures 1, 2 and 4, 1 represents a reflex camera and 2 the lens barrel projecting therefrom. My improved attachment 3, which may be termed a "hood", is of general cylindrical form having its inner end reduced in diameter and forming a collar 4 adapted to fit over the lens barrel 2 and maintain itself in position thereon. This collar portion 4 may be lined with felt 5 or other suitable material to insure a snug engagement without disfiguring the lens barrel.

In the hood 3 an inclined but approximately horizontal plate 6 is located, which divides the hood in substantially two halves, the upper half being open and the lower half being closed by front and rear plates 7 and 8, respectively.

The plate 6 has a reflecting surface, the polish of which being in accordance with the desire of the trade, but it is necessary of course that the polish be such as will reflect the image therein. The angular or inclined disposition of the plate 6 may be varied in different attachments to suit conditions but a slight incline downwardly from the front to the rear end of the plate is sufficient for all ordinary purposes, as indicated in Figure 1 of the drawings.

When my improved device is used in connection with an ordinary camera 12 it is desirable to have a finder 9 attached to the camera, which has a division wall 10 constituting a reflecting surface so that in the finder the image and the reflection will alike be observed.

Figure 5:
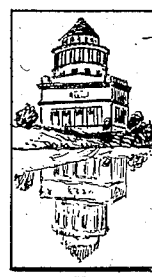
Figure 5 is a view showing a picture such as would be taken with a camera having my improved attachment thereon.

With an attachment such as above described, a picture may be taken which shows both the object and the reflection thereof simulating a reflection in still water whether there be any water near by or not, such a picture being indicated by the reference character 11 in Figure 5.

While I have illustrated a specific construction and attachment which constitutes in effect a hood for easy removal and replacement on the lens barrel of the camera, it is to be distinctly understood that the invention is capable of a wide modification in construction, and I desire to cover broadly the idea of an attachment for a camera having a reflecting surface for the image so that the film or plate receives both the impression of the image and the reflection thereof, and hence various changes and alterations may be made in the general form of the parts described without departing from my invention, and I do not limit myself to the precise details set forth but consider myself at liberty to make such changes and alterations as fairly fall within the spirit and scope of the appended claims.

I claim:

1. A camera attachment, comprising a hood adapted to be positioned on the end of the lens barrel of the camera, and a reflecting plate extending longitudinally within the hood and constituting the lower wall of the open upper portion of the hood.

2. A camera attachment, comprising a hood adapted to be positioned on the end of the lens barrel of the camera, and a reflecting plate extending longitudinally within the hood and constituting the lower wall of the open upper portion of the hood, said hood having front and rear plates below the reflecting plate.

3. A camera attachment, comprising a hood adapted to be positioned on the end of the lens barrel of the camera, a reflecting plate extending longitudinally within the hood and constituting the lower wall of the open upper portion of the hood, said hood reduced in diameter at its inner end, and a collar constituting a part of the hood for removable engagement over the end of the lens barrel.

4. A camera attachment, comprising a hood adapted to be positioned on the end of lens barrel of the camera, a reflecting plate extending longitudinally within the hood and constituting the lower wall of the open upper portion of the hood, said hood having front and rear plates below the reflecting plate, said hood reduced in diameter at its inner end, and a collar constituting a part of the hood for removable engagement over the end of the lens barrel.

5. An attachment for cameras, comprising a hood of general cylindrical form, a longitudinally positioned transversely extending reflecting plate in the hood, and front and rear plates in the hood below the reflecting plate.

6. A camera attachment, comprising a member having a reflecting surface in which the image to be photographed is reflected, said member so positioned that the reflection as well as the image is photographed, said reflecting surface functioning to reproduce the image in lines less sharp than the image directly photographed whereby an effect of an image reflected in water is had.

Signed at New York, in the county or New York and State of New York, this 27th day of March, A. D. 1928.

JACOB H. SUSSMAN.